Oct. 16, 1923.
R. PERRAULT
1,471,278
DEMOUNTABLE RIM FOR AUTOMOBILES
Filed March 31, 1921  2 Sheets-Sheet 1
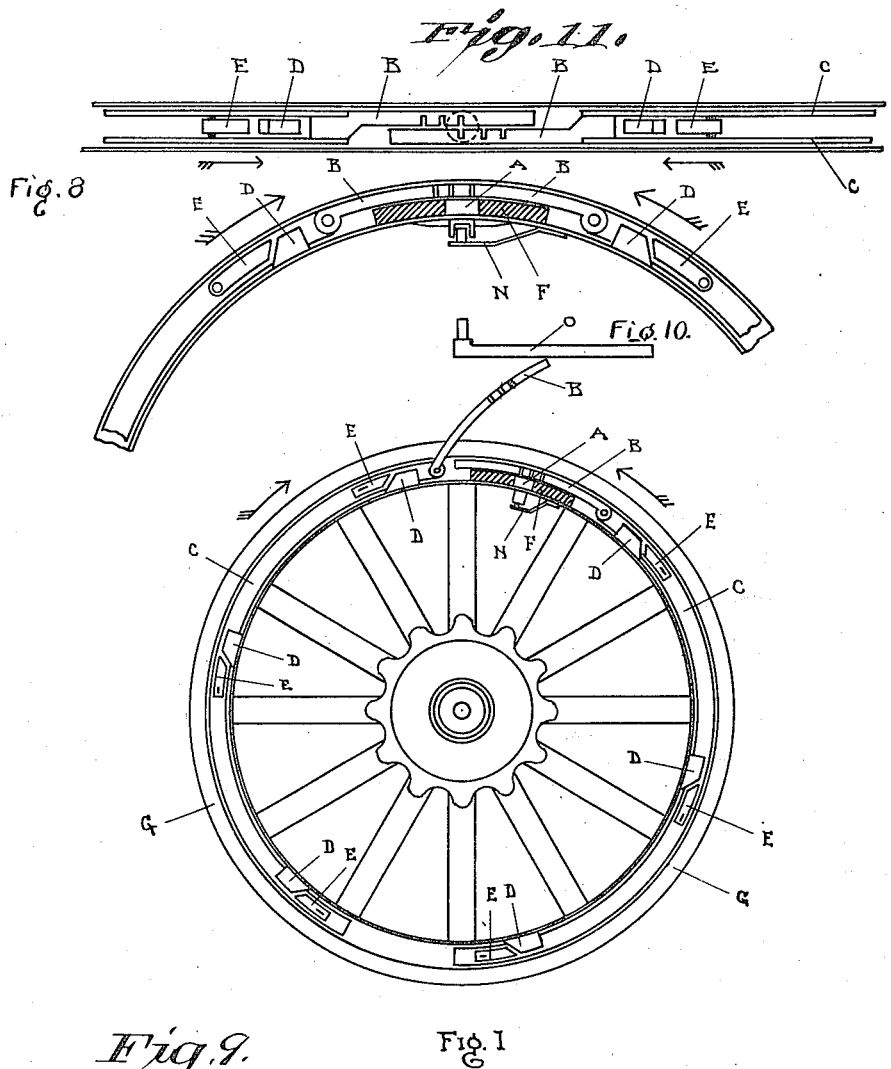
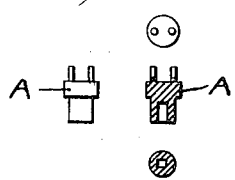
Inventor:
Rodolphe Perrault

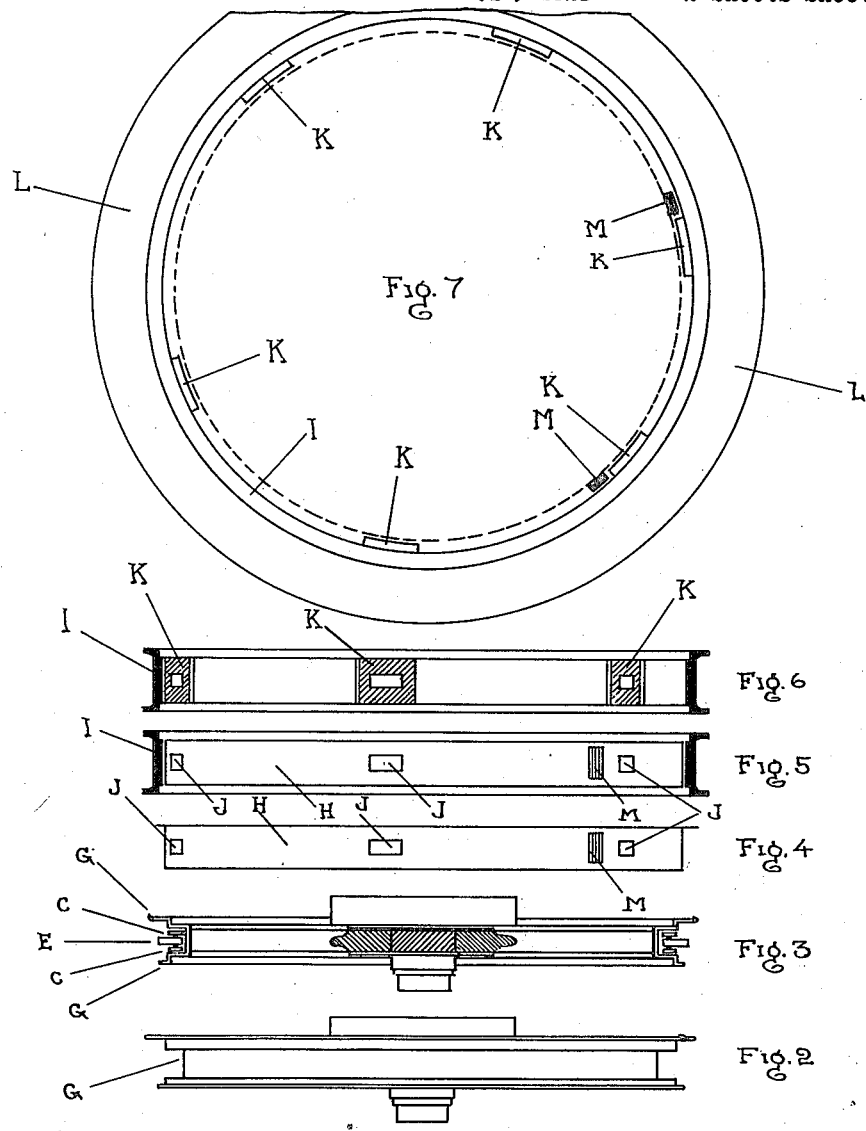

Patented Oct. 16, 1923.

1,471,278

UNITED STATES PATENT OFFICE.

RODOLPHE PERRAULT, OF MONTREAL, QUEBEC, CANADA.

DEMOUNTABLE RIM FOR AUTOMOBILES.

Application filed March 31, 1921. Serial No. 457,558.

*To all whom it may concern:*

Be it known that I, Mr. RODOLPHE PERRAULT, a citizen of Canada, residing at #368 Bercy Street, Montreal, in the county of Hochelaga and Province of Quebec, Canada, have invented a new and useful Demountable Rim for Automobiles, of which the following is a specification.

The present invention relates to new and useful improvements in demountable rims for wheels for automobiles and other like vehicles so arranged that the tires can be quickly placed thereon and removed with more rapidity and efficiency than in the ordinary demountable rims now in use.

The primary object of my invention is the provision of a demountable rim which can be manipulated for replacing much quicker than the ordinary means now in use and which will retain its power of traction and be more efficient than the rims in common use. A further object of my invention is the provision of a demountable rim for automobile wheels having novel locking means for engaging the same and holding it against displacement, at the same time rendering it easily and quickly removable from the rim without any undue labour on the part of the operator. A further object of my invention is the provision of a demountable rim for automobile wheels and the like, which will be comparatively simple and inexpensive to manufacture, reliable and efficient in use, readily operated.

With the above and other objects in view, the present invention resides in the novel features of construction, formations, combinations and arrangements of parts to be hereinafter more fully described, claimed and illustrated in the accompanying drawings forming a part of the present application, and in which:—

Figure 1 is a longitudinal sectional view taken through a wheel showing my improved demountable rim applied thereto;

Figure 2 is the wheel in elevation showing an enlarged detail portion of the wheel rim.

Figure 3 is a similar view with the mechanism applied thereto.

Figure 4 represents the elevation of the ring with stop in sectional view.

Figure 5 is the demountable rim in elevation with the ring of Figure 4, applied thereto.

Figure 6 is a sectional view of my improved demountable rim.

Figure 7 is a side view of the demountable rim with the rubber tire on.

Figure 8 is an enlarged detail sectional view taken through the structure shown in Fig. 1.

Figure 9 represents the key element in elevation and in sectional view.

Figure 10 is an elevation of the operating key, and

Figure 11 is a plan view showing the meeting ends of the actuating segments.

Referring now to the accompanying drawings by corresponding characters of reference throughout the several views, the wheel comprises the hub from which radiate the spokes which have attached to their outer ends a rim "G". This rim "G" is of channel formation, comprising a bottom section and opposite side flanges as shown in Fig. 2.

The bottom section of the rim "G" is provided with spaced lugs "D" as shown in Figures 1 and 8, which extend transversely of the channel and which are provided with bevelled ends for engagement with the locking pins "E" which are pivotally connected between the arcuate bars "C" which are disposed in the channel of the rim "G" as shown in Fig. 8. The free ends of the pins "E" are bevelled to conform to the bevelled ends of the lugs "D" so when the arcuate bars "C" are drawn together, the pins "E" will ride upwardly thereon and engage the sockets formed in the bosses "K" riveted to the demountable rim "I" as shown in Fig. 6. The operating ends of the arcuate bars "C" are pivotally connected to the operating segments "B" which extend parallel to each other and which overlap as shown in Fig. 11, having grooves formed in their inner edges for registration and engagement with the prongs of a rotatable key element "A" held in position by the shoe "F". Obviously upon the rotation of this key element "A" the arcuate bars "C" will be moved to and from each other through the medium of the operating segments "B".

The outer end of the key element "A" is provided with an angular socket for engagement with the angular extension of an operating key "O" as shown in Figs. 8 and 9. When not in use the spring locking key "N" may be engaged within the angular socket of the key element "A" thus preventing any undesired movement of the arcuate bars "C".

In order to insure the proper tread of the demountable rim "I" with reference to the wheel rim "G," a ring "H" is attached to the wheel rim by means of rivets. This ring rests on the inner edges of the flanges of the wheel rim "G," and is provided with aligning openings "J" which register with the sockets formed in the bosses "K" riveted to the demountable rim "I" and through which the locking members "E" are insertable. As clearly shown in Fig. 7 of the drawing, the ring "H" is provided with stops "M" which engage the opposite edges of the adjacent bosses "K," thus preventing any loose play which would affect the proper tread of the wheel. If it is desired to remove the ring for the purposes of repairing, it is simply necessary to remove the rivets and the ring may be separated from the wheel rim "G."

In operation when it is desired to remove the demountable rim, the locking key "N" is removed from the key element "A" and the instrument "O" inserted therein and the key element rotated to force the arcuate bars "C" apart, thus releasing the locking elements "E" from the sockets formed in the bosses "K." When this is done, the outer rim can be slipped from the inner rim. When it is desired to replace the demountable rim, the same is placed over the inner rim after which the key element "A" is rotated until the locking elements "E" are again forced in the sockets formed in the bosses "K" and tightened. The spring locking key "N" is then inserted in the angular socket and the parts are retained in their several positions against displacement.

It will be noted that six of the locking elements "E" are employed, as it has been found that this number affords the greatest efficiency, but it should be understood in this connection that I am not to be limited to such number alone, but may employ any number which will be found preferable.

From the foregoing description taken in connection with the accompanying drawings, it will be manifest that a demountable rim for automobile wheels is provided, which fulfills all the necessary requirements of such a device and it should be understood in this connection that various minor changes in the specific details of construction can be resorted to within the scope of the appended claims without departing from the spirit or sacrificing any of the advantages of my invention.

Having now particularly described and ascertained the nature of my said invention, and in what manner the same is to be performed, I declare that what I claim is:—

1. The combination with a wheel such as described, including a rim, a demountable rim fitted thereon and having sockets formed therein and spaced apart, arcuate bars slidably carried by the wheel rim, locking elements connected to the arcuate bars, and means for moving the bars to and from each other and forcing the locking members into the sockets of the demountable rim.

2. The combination in an apparatus such as described with a wheel including a rim having a channel formed therein, arcuate bars mounted in said channel, means for moving said bars to and from each other, a demountable rim having sockets formed therein, pivoted locking members carried by the arcuate bars, and lugs located within the channel and having beveled ends for engagement with the locking members and forcing them into the sockets of the demountable rim upon movement of the arcuate bars in a given direction.

3. The combination with a wheel including a channelled rim, arcuate bars movable within the channel of said rim, locking elements pivoted to the arcuate bars and movable therewith, lugs disposed in the channel in the path of the locking elements for forcing the latter outwardly, a demountable rim fitted on the wheel rim and having sockets formed therein for receiving said locking elements when the latter are forced outwardly, and an operating means for moving the arcuate bars to and from each other, substantially as and for the purposes set forth.

Signed at Montreal, in the county of Hochelaga, Province of Quebec, Canada, January 15th, 1922.

RODOLPHE PERRAULT.